United States Patent Office 3,159,597
Patented Dec. 1, 1964

3,159,597
CROSS-LINKED ADHESIVE OF A VINYL POLYMER AND A POLYMETHYLOL BIS-PHENOL
Alan K. Forsythe, Manor Township, Lancaster County, Pa., assignor to Armstrong Cork Company, Lancaster, Pa., a corporation of Pennsylvania
No Drawing. Filed Feb. 27, 1961, Ser. No. 91,626
5 Claims. (Cl. 260—847)

This invention relates generally to adhesives, and more particularly to a heat-setting adhesive. Still more particularly the invention relates to a heat-setting adhesive in the form of a solution, or a heat-activatable film, or a cured film which serves to bond an object to a substrate.

The invention contemplates an adhesive film comprising 5–50% by weight of a monomeric tetramethylol bis-phenol having the formula

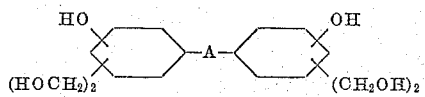

wherein A is an alkylidene radical having 1–5 carbon atoms, and 50–5% by weight of a thermoplastic vinyl resin which is a terpolymer of vinyl chloride, vinyl acetate, and 0.5–5% by weight based on the weight of the resin of maleic anhydride.

The monomeric phenolic compound which is the starting compound of the present invention is the reaction product of formaldehyde and a bis-phenol. The compounds will all be the tetramethylol derivatives of a bis-phenol. Examples of the bis-phenols which are to be reacted with the formaldehyde are bis-(4-hydroxy-phenyl) methane; bis-(2-hydroxy-phenyl) methane; bis-(4-hydroxy, 2-methyl-phenyl) methane; 2,2-bis-(4-hydroxyphenyl) propane; 2,2 - bis - (2,4' - dihydroxy - diphenyl) propane; 2,2 - bis - (2 - hydroxy - phenyl) propane; 2,2-bis - (4 - hydroxy, 2 - methyl - phenyl) butane; and 2,2-bis-(2,4'-dihydroxy-phenyl) pentane.

The reaction of the bis-phenol with formaldehyde is carried out in the presence of a strong alkaline catalyst, especially an alkali metal hydroxide, which is subsequently neutralized. Sufficient formaldehyde is reacted with the bis-phenol to form the tetramethylol compound. Thus the mol ratio of formaldehyde to be reacted with a bis-phenol will be slightly in excess of 4:1. Reaction is usually carried out in an aqueous medium. The mixture of the bis-phenol, formaldehyde, and alkaline catalyst is maintained at a suitably low temperature, for example, 25°–40° C., to produce and maintain the tetramethylol reaction product in the form of a monomer. Temperatures higher than 40° C. will produce polymer, which reduces the cross-linking abilities of the monomer, hence 40° C. is the upper limit of the reaction temperature. The tetramethylol bis-phenols can be isolated by acidification of the reaction mixture and separation of the solids or the oily layer. Water may be stripped from the mixture by warming under vacuum. In view of the low temperatures of reaction necessary to prepare the tetramethylol compounds in the form of the monomer useful in the present invention, the period of time during which the reaction is carried out must be sufficiently long to substantially completely consume all the formaldehyde. Depending on the precise temperature within the limits stated above, the reaction times may vary from two hours to several days, with lower temperatures requiring longer times.

The tetramethylol bis-phenol will generally be prepared initially in the form of an oil. This oil, however, is readily converted to a solid by removing any free formaldehyde from the system mechanically or by thorough washing. It has been found in practice that once the oily product has been converted to a solid, subsequent runs on the same equipment produce the tetramethylol bis-phenols as solid products more readily. This is apparently due at least in part to seeding of the product.

The thermoplastic vinyl resin which forms the other component of the heat-setting adhesive film of the present invention is a terpolymer of vinyl chloride, vinyl acetate, and maleic anhydride. The terpolymer will contain 0.5–5% by weight based on the total weight of the resin of maleic anhydride, and 2–15% by weight vinyl acetate based on the weight of the resin. Most of the resin backbone will thus be polymerized vinyl chloride. The copolymerized vinyl acetate contributes the requisite plasticity to the resin molecule, and renders the molecule more polar in nature. The maleic anhydride contributes the essential dangling carboxyl groups along the backbone. These carboxyl groups serve as cross-linking sites for interaction with the tetramethylol bis-phenol described earlier. In order that the resulting, cured adhesive film have the requisite strength, it is necessary that the carboxyl groups be present in an amount established by the 0.5–5% by weight maleic anhydride in the resin molecule. These terpolymers are readily prepared by emulsion polymerization, suspension polymerization, or bulk polymerization, but are preferably made by suspension polymerization. The molecular weights will run generally in the range of about 10,000 to 12,000. Such terpolymers are available items of commerce, and one of the most suitable of the terpolymers is sold under the name "VMCH" containing 87% by weight vinyl chloride, 12% by weight vinyl acetate, and 1% by weight maleic anhydride.

The tetramethylol bis-phenol should be present in an amount of about 5–50% by weight of the two ingredients. The balance of the adhesive will be the terpolymer described earlier. Amounts of the tetramethylol compound larger than about 50% by weight produce too stiff a film, and one which does not have good adherent properties to a wide variety of surfaces such as steel, vinyl films, and the like. Amounts of the tetramethylol bis-phenol less than about 5% by weight of the two ingredients are insufficiently cross-linked due to the reduced amount of the cross-linking agent to be used. Such films remain substantially thermoplastic and are little better than the thermoplastic vinyl resin itself. The tetramethylol bis-phenols used in the present invention appear to give stronger and tougher films than dimethylol compounds such as dimethylol phenols, substituted or unsubstituted. It is postulated that the tetramethylol compounds yield a flexible bridge when the compounds function as cross-linking agents in the adhesive of the present invention. The preferred amount of the tetramethylol compound is between 8% and 15% by weight of the total adhesive formulation.

The most convenient method for applying the adhesive film of the present invention is from solution. Accordingly, the thermoplastic vinyl resin terpolymer and the tetramethylol bis-phenol are preferably taken up in a solvent system. Such solvent systems comprise ketones, such as methyl ethyl ketone, methyl isobutyl ketone, acetone, and mixtures of ketones. Toluene may be used as one ingredient in the ketone-based solvent system. The tetramethylol compound itself is soluble in dioxane, and accordingly, dioxane may be used as an ingredient in a solvent system or as the solvent itself. Plasticizers such as dioctyl phthalate, tributyl phthalate, epoxidized soya bean oil, and other normal plasticizers for vinyl resins may also be added to render the adhesive film more flexible if such is desired.

As an alternative method of use of the adhesive of the present invention, the mixture containing the proper ratios of the thermoplastic vinyl resin terpolymer and the tetramethylol compound may be added to an existing adhesive such as a rubber-based solvent-type adhesive. Such addition improves the properties of the rubber-based adhesive, particularly as to heat strength.

In application, the solution or other carrying medium for the adhesive of the present invention is spread on the substrate, and the solvent allowed to evaporate. The object to be adhered such as a clear vinyl film, or vinyl chips, or fabric, may then be placed on top of the adhesive film, and the whole assembly subjected to heat and pressure until the adhesive film has cured. Temperatures in the range of 370° F. to 400° F. are preferred, since such temperatures suffice to cure the tetramethylol bis-phenol and to soften the thermoplastic terpolymer vinyl resin, and to cause cross-linking. The invention has particular application in adhering sheets and particles of vinyl resin compositions to thin sheet steel backings in order to produce vinyl-coated flexible sheet steel for manufacture of panels, desks, appliance and radio casings, and the like.

The following examples illustrate several embodiments of the invention. All parts are by weight unless otherwise stated.

Example 1

Three solutions were made up having the following amounts of the following ingredients:

| Ingredients | No. 1 | No. 2 | No. 3 |
|---|---|---|---|
| Vinyl chloride 87%, vinyl acetate 12%, maleic anhydride 1% terpolymer (VMCH) | 100 | 100 | 100 |
| 2,2-bis-(3,5-dimethylol, 4-hydroxylphenyl) propane | | 11.1 | 11.1 |
| Dioctyl phthalate | 25 | 25 | |
| Methyl ethyl ketone | 190 | 190 | 190 |
| Methyl isobutyl ketone | 90 | 90 | 90 |
| Toluene | 95 | 95 | 95 |

The solution in each case was wiped onto a flexible sheet steel plate, and the solvent was allowed to evaporate at room temperature. A layer of pigmented, plasticized, polyvinyl chloride particles was spread over the adhesive film, and the assembly was heated under radiant heat to 370°–400° F. On cooling, the fused vinyl film formed from the particles could be readily peeled by hand from the flexible sheet on which had been placed solution No. 1. The sheet formed from solutions 2 and 3 could not be pulled from the steel plate; instead, the fused film itself tore.

Example 2

Solution No. 3 as formulated in Example 1 is added in an amount of 100 parts to 100 parts of a solvent-type neoprene adhesive comprised of a ketone-toluene solution of neoprene admixed with one-half the amount of the neoprene of a heat-advancing oil-soluble resin which is the condensation product of formaldehyde and tertiary butyl phenol.

The resulting film bonds better to vinyl films than does the neoprene adhesive in the absence of the added terpolymer and tetramethylol bis-phenol.

Example 3

To a solvent mixture of 190 parts methyl ethyl ketone, 90 parts methyl isopropyl ketone, and 95 parts toluene, was added 75 parts vinyl chloride-vinyl acetate-maleic anhydride terpolymer containing 1% maleic anhydride, and 25 parts butadiene-acrylonitrile copolymer (Hycar 1001). There was then added a solution of 20 parts of 2,2-bis-(3,5-dimethylol, 4-hydroxyl-phenyl) propane dissolved in 80 parts dioxane.

The resulting solution is spread on steel and the solvents allowed to evaporate. When a vinyl film is pressed to the adhesive surface and heated to a temperature in the range of 370°–400° F., a tough, strong bond results.

When this experiment is repeated using bis-(3,5-dimethylol, 4-hydroxyl-phenyl) methane, a tough, strong bond also results.

I claim:

1. A heat-setting adhesive comprising 5–50% by weight of a monomeric tetramethylol bis-phenol having the formula

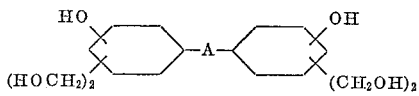

wherein A is an alkylidene radical having 1–5 carbon atoms, and 50–5% by weight of a thermoplastic vinyl resin which is a terpolymer of vinyl chloride, vinyl acetate, and 0.5–5% by weight based on the weight of the resin of maleic anhydride.

2. An adhesive according to claim 1 wherein said tetramethylol bis-phenol is present in an amount of about 8–15% by weight, the balance being said terpolymer.

3. An adhesive according to claim 1 wherein said monomeric tetramethylol bis-phenol comprises bis-(3,5-dimethylol, 4-hydroxy-phenyl) methane.

4. An adhesive according to claim 1 wherein said tetramethylol bis-phenol comprises 2,2-bis-(3,5-dimethylol, 4-hydroxy-phenyl) propane.

5. An adhesive according to claim 1 dissolved in a solvent therefor.

References Cited in the file of this patent

UNITED STATES PATENTS

| 2,324,078 | Gray et al. | July 13, 1943 |
| 2,479,409 | Roedel | Aug. 16, 1949 |
| 2,793,141 | Barr | May 21, 1957 |
| 2,951,769 | McKnight | Sept. 6, 1960 |